United States Patent [19]

Sides

[11] Patent Number: 5,652,846
[45] Date of Patent: Jul. 29, 1997

[54] BUS DEADLOCK PREVENTION CIRCUIT FOR USE WITH SECOND LEVEL CACHE CONTROLLER

[75] Inventor: Chi Kim Sides, Spring, Tex.

[73] Assignee: Compaq Computer Corporation, Houston, Tex.

[21] Appl. No.: 497,820

[22] Filed: Jul. 3, 1995

[51] Int. Cl.⁶ ................................................ G06F 12/08
[52] U.S. Cl. .......................... 395/288; 395/469; 395/470; 395/449; 395/726
[58] Field of Search ......................... 395/288, 469, 395/470, 449, 726

[56] References Cited

U.S. PATENT DOCUMENTS 5,133,074  7/1992  Chou ........................................ 395/473
5,353,423 10/1994  Hamid et al. ........................... 395/470
5,517,625  5/1996  Takahashi ............................... 395/288
5,519,839  5/1996  Culley et al. .......................... 395/310
5,542,056  7/1996  Jaffa et al. ............................ 395/306
5,561,779 10/1996  Jackson .................................. 395/449

*Primary Examiner*—Matthew M. Kim
*Assistant Examiner*—Vincent Yip
*Attorney, Agent, or Firm*—Pravel, Hewitt, Kimball & Krieger

[57] ABSTRACT

A computer system which corrects errors in a second level cache controller. The cache controller erroneously provides the cycle lock signal for the entire period of a writeback cycle followed by an I/O bus access, thus causing a deadlock if an I/O bus master needs access to the host bus at the same time. A circuit determines when the writeback cycle is occurring and masks the lock signal during the writeback operation, so that the long lock assertion is not present and the arbiters can properly control the access to the buses.

8 Claims, 5 Drawing Sheets

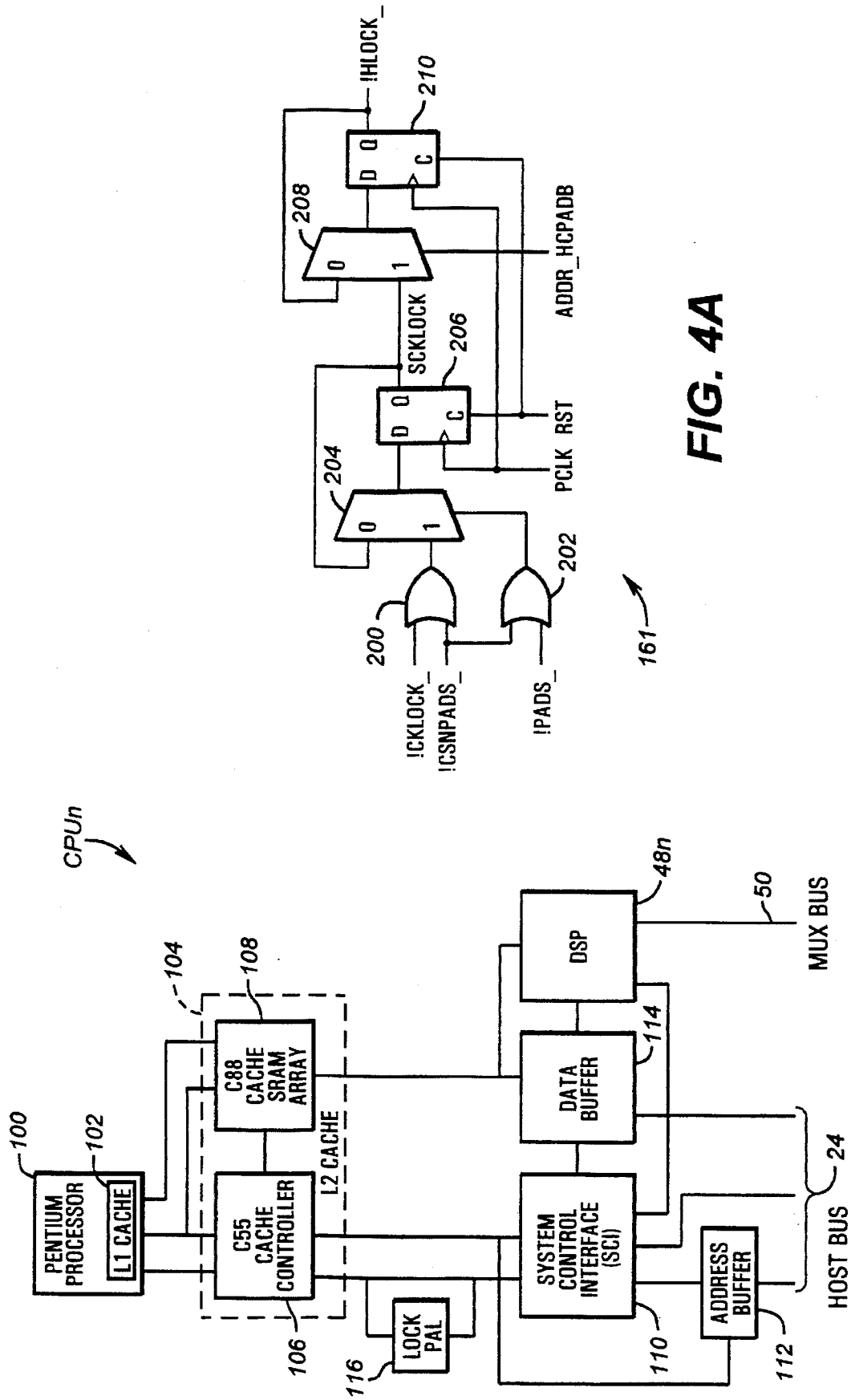

1

BUS DEADLOCK PREVENTION CIRCUIT FOR USE WITH SECOND LEVEL CACHE CONTROLLER

SPECIFICATION

BACKGROUND OF THE INVENTION

1. Field of the Invention

The invention relates to cache systems used in computer systems, and more particularly to a circuit to correct errors in lock cycles passed by a second level cache controller.

2. Description of the Related Art

Computer systems are getting ever more powerful. Originally personal computers used a simple 8 and 16 bit microprocessor at a relatively slow clock rate. As the capabilities of the microprocessors and subsystems improved, so did system performance. 16 and 32 bit microprocessors were used and clock rates increased from 2 or 4.77 MHZ to 66 MHZ. Memory speeds increased, though not quite at the same rate as the performance increase in the microprocessors. To partially alleviate this lag, memory system architectures became more elaborate. Cache memory systems were used to bridge the speed gap. Eventually a cache system was integrated onto the microprocessor, with second level external cache systems being used in performance oriented cases. Many computer systems using second level caches and multiple processors were produced, such as the SYSTEMPRO XL and PROLIANT® 2000 and 4000 computer systems from Compaq Computer Corporation. These particular computer systems used Intel Corporation PENTIUM® processors and the 82496/82491 chips to form the second level cache system. Because of performance limitations in those systems during four processor use, a third level cache system was added to each processor board. The third level cache was 2 Mbytes in size and reduced host or common processor bus utilization to a level to allow four processor operation without bus saturation. Details of this design are provided in U.S. patent application Ser. No. 08/237,779, filed May 4, 1994, and entitled "PROCESSOR BOARD HAVING A SECOND LEVEL WRITEBACK CACHE SYSTEM AND A THIRD LEVEL WRITETHROUGH CACHE SYSTEM WHICH STORES EXCLUSIVE STATE INFORMATION FOR USE IN A MULTIPROCESSOR COMPUTER SYSTEM", now U.S. Pat. No. 5,561,779 issued Oct. 1, 1996 which is hereby incorporated by reference. However, the requirement for a third level cache system increased the complexity and cost of the processor boards.

Intel ultimately designed next generation versions of the 82496/82491 chips, referred to as the C55 cache controller and the C88 cache RAMs. These new chips allowed the second level cache to be expanded to 2 Mbytes, from 512 kbytes for the 82496/82491, thus obviating the need for the third level cache. Therefore it was desirable to utilize these chips in a new processor board design. However, certain problems were eventually found in the C55 cache controller, which problems needed corrected to allow a processor board to operate properly. These problems are described in detail in the detailed description of the preferred embodiment.

SUMMARY OF THE PRESENT INVENTION

A computer system according to the present invention is capable of using the C55/C88 cache controller and SRAMs without the problems previously associated with the chips. The computer system includes a circuit which decodes when a potential problem cycle is present and blocks the problem signal at the proper time. This circuit thus allows the C55/C88 chips to be used successfully.

BRIEF DESCRIPTION OF THE DRAWINGS

A better understanding of the present invention can be obtained when the following detailed description of the preferred embodiment is considered in conjunction with the following drawings, in which:

FIG. 2 is a block diagram of the CPUs of FIG. 1, including the circuit of the present invention;

FIG. 4A is a schematic diagram of the LOCK module of FIG. 4;

DETAILED DESCRIPTION OF THE PREFERRED EMBODIMENT

Figure 1:
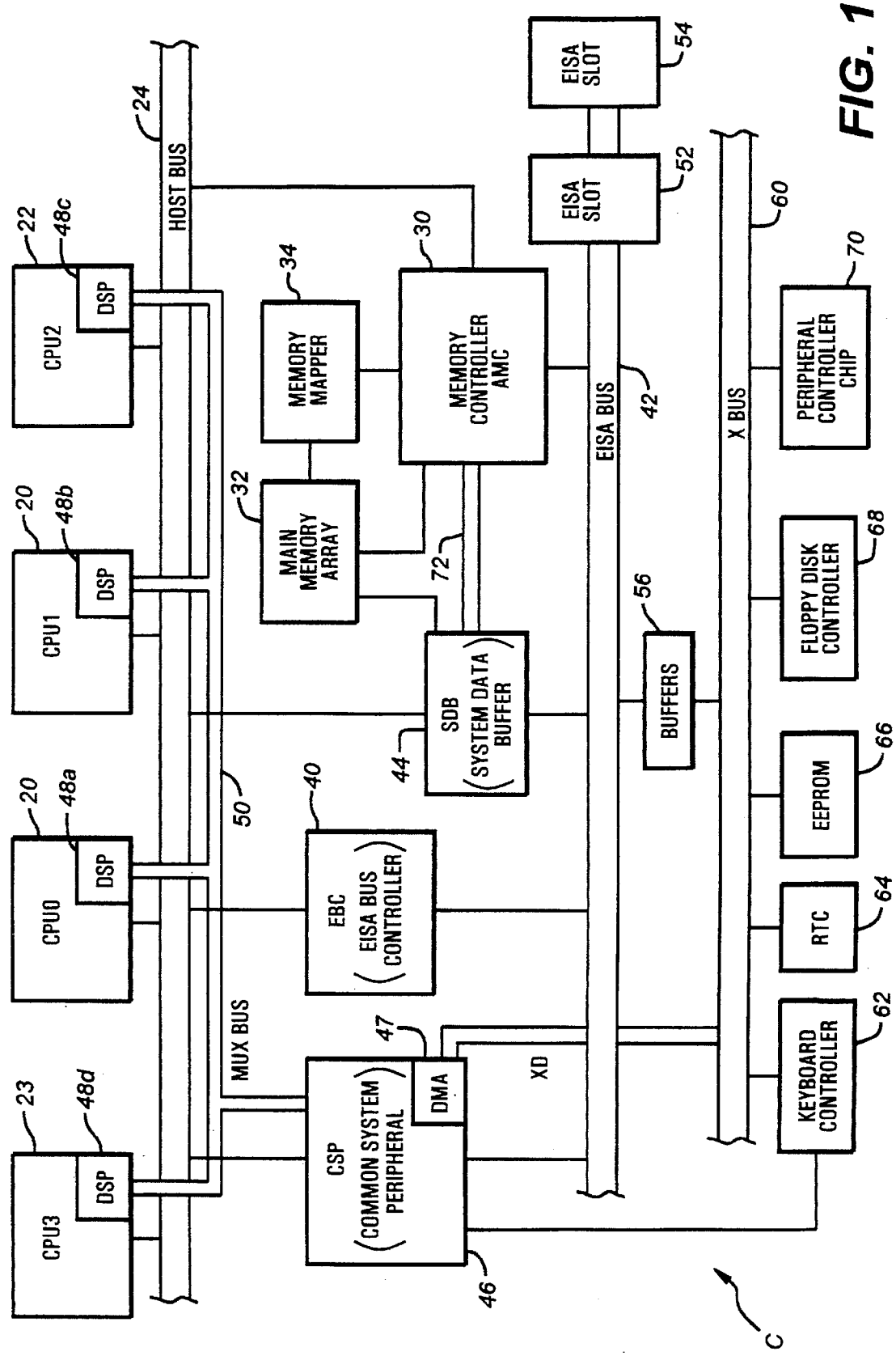
FIG. 1 is a block diagram of a computer system incorporating the present invention.

Referring now to FIG. 1, a computer system C is shown incorporating a third level cache according to the present invention. The computer system C is preferably a multiprocessor system, although a computer system according to the present invention may include more processors or may be a single processor system. The elements of the computer system C that are not significant to the present invention, other than to illustrate an example of a fully configured computer system, are not discussed in detail.

The computer system C preferably includes four CPUs, referred to as CPU 20, CPU 21, CPU 22 and CPU 23, respectively, which are connected to a host bus 24. The host bus 24 preferably includes a host clock signal referred to as HCLK, which is preferably approximately 33 MHZ. In the preferred embodiment, CPU 20 is logically assigned the position of CPU0, CPU 21 is logically assigned the position of CPU1, CPU 22 is assigned logical CPU2, and CPU 23 is logically assigned the position of CPU3, although these assignments are preferably programmable and may be changed. A memory controller 30 is coupled to the host bus 24 to an expansion bus 42, where the expansion bus 42 is preferably the Extended Industry Standard Architecture (EISA) bus, although other types of expansion buses are contemplated. The memory controller 30 is also coupled to a main memory array 32, where the memory array 32 preferably comprises dynamic random access memory (DRAM). A data destination facility (DDF), otherwise known as memory mapper logic 34, is coupled to the memory controller 30 and the memory array 32, and provides memory mapping functions to facilitate memory accesses to the memory array 32. An underline at the end of a signal name denotes negative logic where the signal is asserted low and negated high. An exclamation point at the start of a signal name indicates the inverse of the signal. The computer system C includes an EISA bus controller (EBC) 40, which is coupled between the host bus 24 and the EISA bus 42. The EBC 40 provides various bus cycle translation and conversion functions to facilitate transfers between the host bus 24 and the EISA bus 42. A system data buffer (SDB) 44 is coupled to the host bus 24, the EISA bus 42, the memory controller 30 and the memory array 32. The connection between the SDB 44 and the memory controller 30 is preferably a memory bus 72, which includes 144 bits preferably comprising 128 data bits and 16 error check bits. The SDB 44 functions to buffer and transfer data between the host bus 24 and the memory array 32, between the host bus 24 and the EISA bus 42 and between the EISA bus 42 and the memory array 32.

A logic block referred to as the central system peripheral (CSP) 46 is coupled between the host bus 24 and the EISA bus 42. The CSP 46 is coupled to logic blocks referred to as the distributed system peripherals (DSPs) 48a, 48b, 48c and 48d in the CPUs 20, 21, 22 and 23, respectively, through a multiplexed (MUX) bus 50. For more information on the operation of the MUX bus 50, please see application Ser. No. 07/955,482, entitled "MULTIPLEXED COMMUNICATION PROTOCOL BETWEEN CENTRAL AND DISTRIBUTED PERIPHERALS IN MULTIPROCESSOR COMPUTER SYSTEMS," filed Oct. 2, 1992, now U.S. Pat. No. 5,517,624, issued May 14, 1996, which is hereby incorporated by reference. For more information on the CSP 46 and the DSPs 48a, 48b, 48c and 48d, please see application Ser. No. 07/955,683, entitled "ARRANGEMENT OF DMA, INTERRUPT AND TIMER FUNCTIONS TO IMPLEMENT SYMMETRICAL PROCESSING IN A MULTIPROCESSOR COMPUTER SYSTEM," filed Oct. 2, 1992, now U.S. Pat. No. 5,517,624, issued May 14, 1996, which is hereby incorporated by reference. The CSP 46 is also coupled to a keyboard controller 62. The CSP 48 includes a direct memory access (DMA) controller 47 which is preferably implemented as a true EISA bus controller. The CSP 48 also includes an arbiter which arbitrates between the EISA bus 42 and the host bus 24. The operation of this arbiter will be described in more detail below.

The EISA bus 42 includes a plurality of EISA slots 52 and 54 for receiving EISA expansion cards, such as network interface or hard disk interface cards for example. EISA bus masters may reside on these EISA expansion cards plugged into the EISA slots 52 and 54. The EISA bus 42 is coupled through buffers 56 to a bus referred to as the X bus 60. A number of peripheral devices are coupled to the X bus 60, including the keyboard controller 62, a real time clock (RTC) 64, an electrically erasable programmable read only memory (EEPROM) 66, a floppy disk controller 68, and a peripheral controller chip 70 which includes numerous parallel ports and UARTS (universally a synchronous receiver/transmitters). The CSP 46 is coupled to an 8-bit data bus of the X bus 60 referred to as XD.

The CPUs 20, 21, 22 and 23 are preferably identical, though different designs can be mixed. The preferred embodiment for the CPUs 20, 21, 22 and 23 is shown in FIG. 2. A microprocessor 100, preferably a Pentium processor from Intel Corp., includes a L1 or first level cache 102. The microprocessor 100 is connected to an L2 or second level cache 104. Preferably the L2 cache 104 is formed using the C55 cache controller 106, the next generation of the 82496 cache controller, and an array of C88 cache SRAMs 108, the next generation of the 82491 cache SRAMs, all these chips from Intel Corp. Familiarity with the Pentium, the C55, C88, 82496 and the 82491 is assumed in this discussion. For details on these devices, please refer to the appropriate device handbooks from Intel. The L2 cache 104 is connected as suggested by the manufacturer. The C55 cache controller 106 is a writeback cache controller configured to operate with the Pentium processor.

The C55 cache controller 106 is implemented to follow a modified exclusive shared invalid (MESI) protocol, where each of the cache subsystems may be the exclusive owner of data which was originally read from the memory array 32. The CPUs 20, 21, 22 or 23 may modify the data within its cache memory so that the new data is not the same as the data in the corresponding memory location in the memory array 32. The CPU 20, 21, 22 or 23 is then the exclusive owner of the data at that particular memory address and is responsible for maintaining the correctness of the data provided in any future read operations to that address. Also, the owner CPU must inform the other CPU having data from the corresponding data address of the cycle so that the other CPU can determine that its data is now valid.

Thus, if one of the CPUs 20, 21, 22 or 23 attempts to access data from the memory array 32 that is dirty, the owner CPU detects this read request, causes the other CPU that is on the host bus 24 to temporarily abort its access and the owner CPU 22 updates or writes-back the owned data to the memory array 32. In the preferred embodiment, the writeback is to an entire line of data, where each line is preferably 512 bits or 64 bytes. The C55 cache controller 106 incorporates snooping logic to maintain the MESI state and to cause writeback operations.

The L2 cache 104 must be connected to the host bus 24 by suitable interface hardware. This is primarily accomplished using a system control interface or SCI 110. The SCI 110 performs translation of cycles between the L2 cache 104 and the host bus 24 and otherwise controls the operations between the two units. The SCI 110 controls an address buffer 112 which is connected to the host bus 24 and to the L2 cache 104. The SCI 110 further controls a data buffer 114 which is connected between the host bus 24 and the data bus portion of the L2 cache 104. The SCI 110 further controls the DSP 48 contained on the CPU card. The DSP 48 is connected to the MUX bus 50. The SCI 110 can operate as indicated in the Intel manuals relating to connection of the L2 cache 104 to the host bus 24 or can include other features as illustrated and described in Ser. No. 07/955,508, entitled "APPARATUS FOR STRICTLY ORDERED INPUT/OUTPUT OPERATIONS FOR INTERRUPT SYSTEM INTEGRITY", now U.S. Pat. No. 5,367,689, issued Nov. 22, 1994; Ser. No. 07/955,477, entitled "METHOD AND APPARATUS FOR CONCURRENCY OF BUS OPERATIONS", now U.S. Pat. No. 5,353,415, issued Oct. 4, 1994; and Ser. No. 07/955,501, entitled "METHOD AND APPARATUS FOR NON-SNOOP WINDOW REDUCTION", now U.S. Pat. No. 5,463,753, issued Oct. 31, 1995 which were all filed on Oct. 2, 1992 and are hereby incorporated by reference.

In addition, the CPU contains a LOCK PAL 116. The LOCK PAL 116 contains the necessary logic to resolve a problem in the C55 cache controller 106. The LOCK PAL 116 is described in more detail below.

Figure 3:
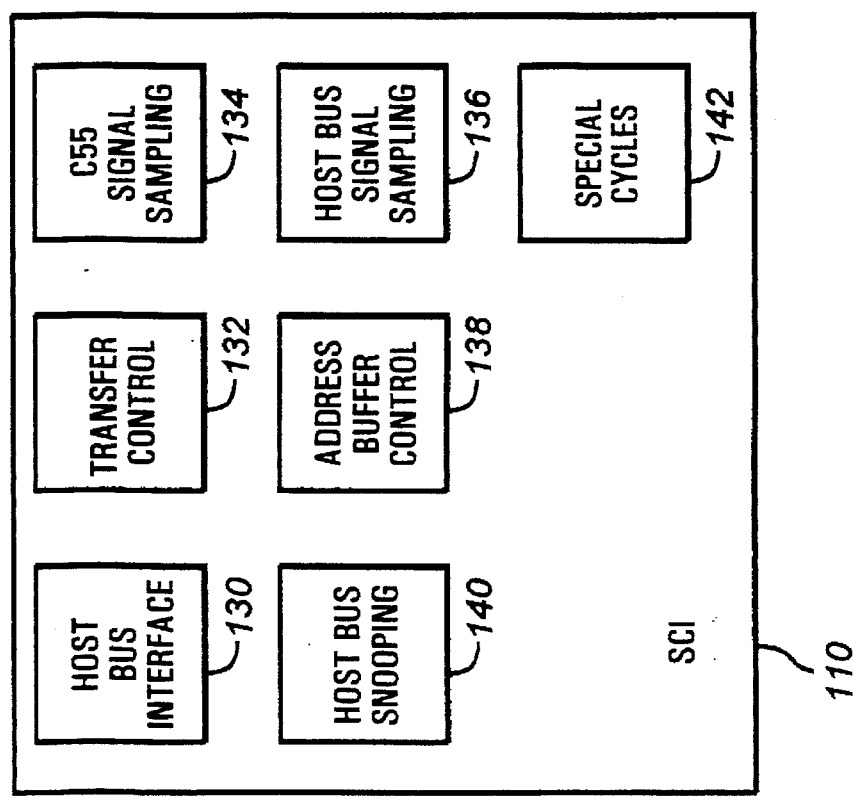
FIG. 3 is a block diagram of the system control interface of FIG. 2.

FIG. 3 illustrates the various modules in the SCI 110. The first module is the host bus interface module 130 which tracks the host bus 24 and provides various signals to other modules and provides certain host bus control signals, including the HLOCK_ signal, which indicates that the cycle on the host bus 24 is a locked cycle and other bus masters, such as the EISA bus 42 and other CPUs are not allowed to intervene in the present cycles. The second module is the transfer control module 132 which is responsible for the operation and data flow of particular cycles. The C55 signal sampling module 134 is used to sample the various signals from the C55 cache controller 106. The host bus signal sampling module 136 similarly samples and obtains signals from the host bus 24. The address buffer control module 138 controls the latching, driving and direction of the address buffer 112. A host bus snooping module 140 is responsible for tracking and snooping the host bus 24 to provide snoop strobes and snoop requests to the L2 cache 104. A special cycle module 142 handles the various special cycles developed by the Pentium processor 100.

Figure 4:
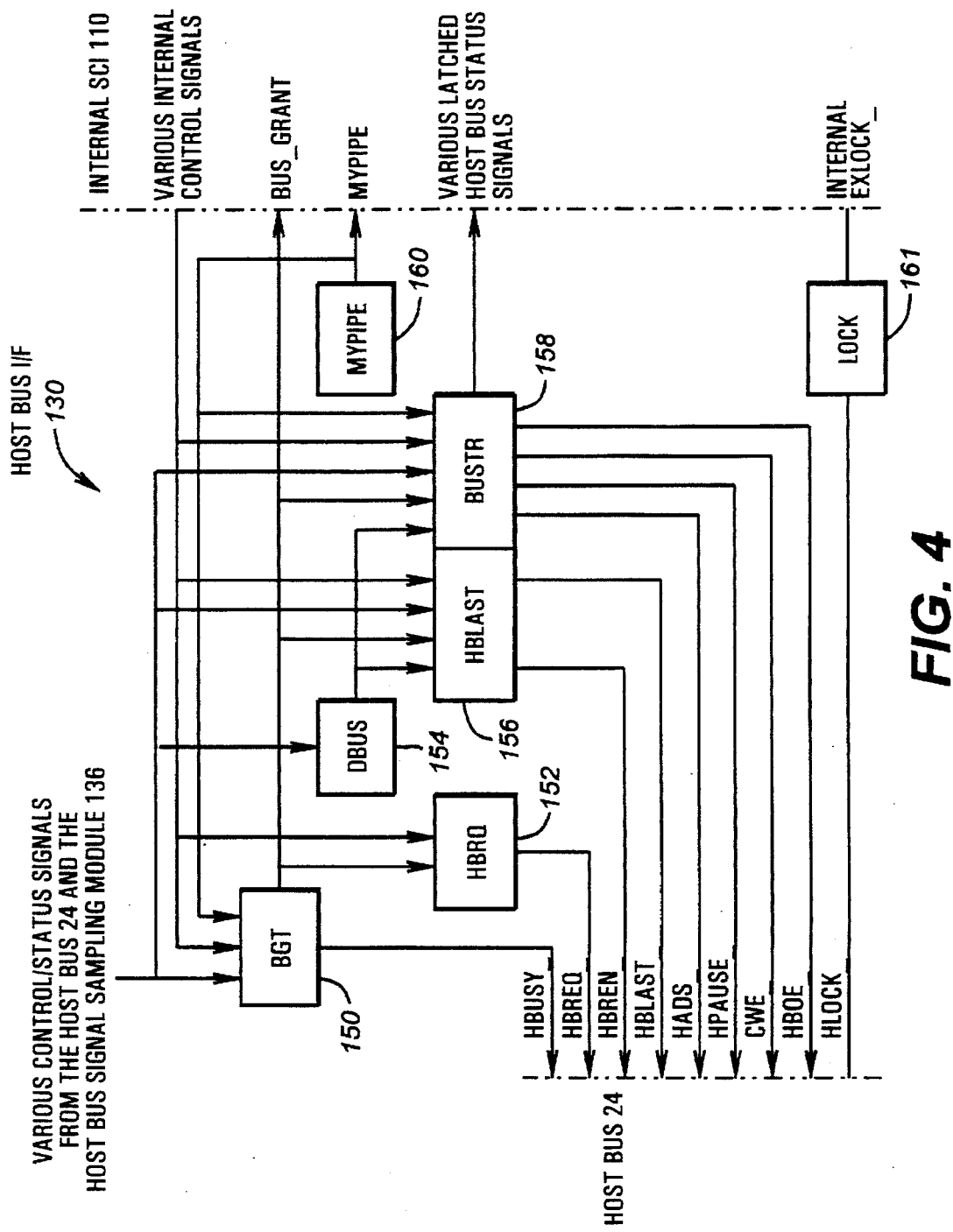
FIG. 4 is a block diagram of the host bus interface module of FIG. 3.

The Host Bus Interface Module (HBIM) 130 includes various state machines which track the progress of the host bus 24, informs other modules of the host bus status, and drives a number of host bus control signals. The six state machines are illustrated in FIG. 4 and are referred to as the BGT, HBRQ, DBUS, HBLAST, BUSTR, and MYPIPE state machines 150, 152, 154, 156, 158 and 160, respectively. The HBIM 130 also includes a LOCK module 161 which transfers the CKLOCK_ signal from the C55 cache controller 106 to be the HLOCK_ signal for the host bus 24. The HLOCK_ signal is interpreted by the memory controller 30, the EBC 40 and the CSP 46 to provide the LOCK_ signal to the EISA bus 42, in the arbitration of the host and EISA buses 24 and 42 and in controlling main memory cycles.

The BGT state machine 150 is responsible for tracking the ownership of the host bus 24, informing the remainder of the SCI 110 when ownership of the host bus 24 is achieved, and driving the HBUSY_ signal to the host bus 24 when the SCI 110 owns the host bus 24 to indicate that the host bus 24 is busy. The HBRQ state machine 152 is responsible for requesting ownership of the host bus 24. The HBREQ_ or host bus request signal is driven active whenever the C55 cache controller 106 has issued a transaction which is to go to either the host bus 24 or the EISA bus 42. The HBREQ_ signal is driven inactive, either when the HBRQ state machine 152 sees that the SCI 110 owns the bus or when the HBRQ state machine 152 samples the CSNPADS_ signal from the C55 cache controller 106, indicating an active snoop-hit to a modified line. The DBUS state machine 154 tracks the host bus 24 and determines when the host data bus is busy with another host bus master's transaction. The DBUS state machine 154 drives an internal signal, called EDBB or external data bus busy to provide this indication. The HBLAST state machine 156 tracks the host bus 24 to determine when the SCI 110 has control of the host data bus and is responsible for driving the HBLAST_ and HBREN_ signals to indicate the final cycle of an operation and to drive the data buffer 114.

The BUSTR state machine 158 consists of a state machine and sample/latch/decode logic for the host bus status signals and processor 100 status signals. The BUSTR state machine 158 is responsible for driving the HADS_, HPAUSE_, CWE_, and HBOE_ signals. The HPAUSE_ signal is actually combined with the HPAUSE_ signal out of the host bus snooping module 140 before going out to the host bus 24 to indicate a pause in the cycle pending on the host bus 24. The HPAUSE_ signal is driven by the BUSTR state machine 158 when the SCI 110 is doing a write cycle, but data has not yet been transferred to the data buffer 114, either because the C55 cache controller 106 has not driven the CDTS_ or data strobe signal or the SCI 110 is using the local data bus for a previous cycle, such as a read line-fill. The BUSTR state machine 158 can be pipelined on top of itself by being in more than one state at a time. This allows a single state machine to have control of the mentioned host bus control signals and have pipelining capability. The remaining logic of the BUSTR state machine 158 consists of latch-and-hold circuitry for the DDF or memory mapper 34 signals and the processor 100 status signals. It also includes decoding logic to create a synchronized write-to-own flag or WTO_FLAG signal.

The MYPIPE state machine 160 tracks the SCI 110 host bus 24 cycles and determines when the SCI 110 is pipelined at the host bus 24 on top of itself. This determination is used by various state machines to qualify the sampling of HBRDY_ or cycle ready and HBLAST_ signals active.

The LOCK module 161 (FIG. 4A) receives the CADS_ and CKLOCK_ signals from the C55 cache controller 106 and the CSNPADS_ signal which indicates that a snoop address is valid. The !CKLOCK_ signal, the inverse of the CKLOCK_ signal, is provided to one input of a two input OR gate 200. The second input of the OR gate 200 receives the !CSNPADS_ signal. The !CSNPADS_ signal is also provided as one input to a two input OR gate 202, which also receives the !CADS_ signal. The output of the OR gate 200 is provided to the one input of a multiplexer 204. The output of the OR gate 202 is connected to the select input of the multiplexer 204. The output of the multiplexer 204 is provided to the D input of a D-type flip-flop 206. The flip-flop 206 is clocked by the PCLK or processor clock signal and is cleared by the RST or reset signal. The output of the flip-flop 206 is provided to the zero input of the multiplexer 204 and to the one input of a multiplexer 208. The selection of the multiplexer 208 is provided by the ADDR_HCPAB signal, which is used to clock a new address into the address buffer 112. The output of the multiplexer 208 is provided to the D input of a D-type flip-flop 210. The flip-flop 210 is clocked by the PCLK signal and is cleared by the RST signal. The output of the flip-flop 210 is the !HLOCK_ signal, which is also provided to the zero input of the multiplexer 208. Thus the CKLOCK_ signal is passed to the HLOCK_ signal on each new cycle from the C55 cache controller 106. The HLOCK_ signal is driven from the SCI 110 only when the particular SCI 110 is the owner of the host bus 24.

Figure 5:
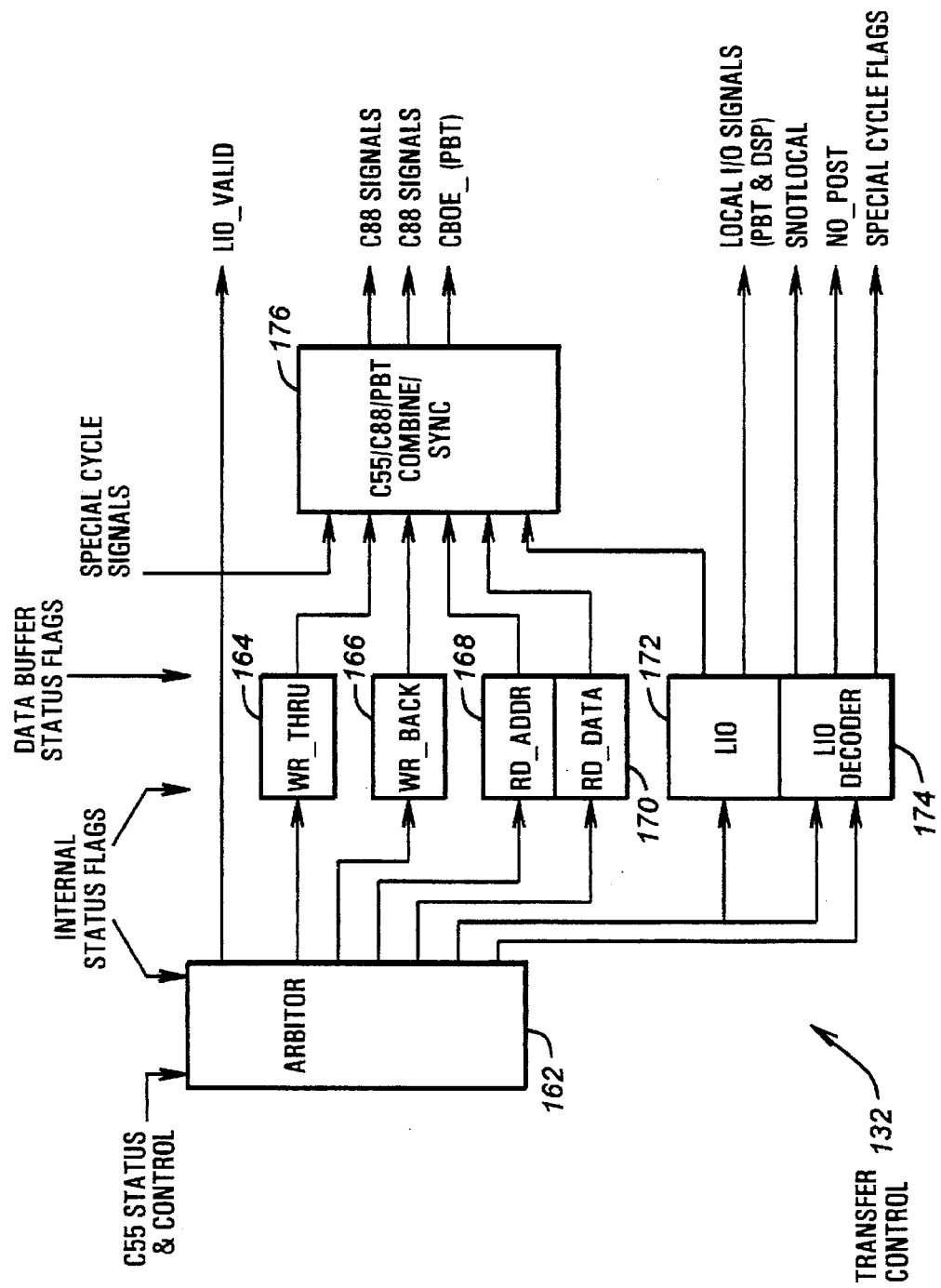
FIG. 5 is a block diagram of the transfer control module of FIG. 3.

The Transfer Control Module or TCM 132 is responsible for the operation and data flow of the cycle and is shown in more detail in FIG. 5. The transfer control module 132 includes various state machines and other submodules. The state machines include an arbiter state machine 162, a WR_THRU state machine 164, a WR_BACK state machine 166, a RD_ADDR state machine 168, a RD_DATA state machine 170, a local I/O or LIO state machine 172, a local I/O decoder 174 and a combine/synchronization module 176.

The arbiter state machine 162 is responsible for sampling and decoding the L2 cache 104 CADS_ address status signal and the L2 cache 104 status signals and for initiating the cycle. For example, after the arbiter state machine 162 has sampled the CADS_ signal and the L2 cache 104 status signals and has determined that the cycle is a non-cacheable read, the arbiter state machine 162 asserts the RD_ST signal. The RD_ST signal remains asserted until the CNA_ or cache next address signal is sampled asserted or when the CSNPADS_ signal is sampled asserted. If the arbiter state machine 162 determines a memory write or write allocate cycle is occurring, the appropriate signals are provided to the other state machines and modules in the SCI 110 to allow the cycle to be performed. In the case of an input/output (I/O) cycle, the arbiter state machine 162 ensures that the C55 cache controller 106 is driving the address lines by sampling the CMOE_ or cache memory address output enable signal. If the CMOE_ signal is sampled asserted, then the arbiter state machine 162 asserts LIO_LTCH or local I/O latch signal for 1 PCLK cycle. The LIO_LTCH signal is used by the LIO decoder module 174 to latch the address lines in the LIO decoder module 174. In the next PCLK cycle, the arbiter state machine 162 asserts the LIO_ST signal for one PCLK. This is used to open the latch after the LIO decoder 174 to allow the decoded status signals flow to the LIO state machine 172 and to the Special Cycle module 142 in the case of a special cycle. The LIO_ST signal is also used by the LIO state machine 172 to initiate the state machine. If the LIO decoder 174 has determined that the cycle is to a non-local address, then it asserts the SNOTLOCAL signal. After the arbiter state machine 162 has sampled SNOTLOCAL signal active, then the arbiter state machine 162 determines if the cycle is a read or a write and issues either the RD_ST or WR_ST signals to start the appropriate state machines.

The WR_Thru state machine 164 is responsible for all writes to the host bus 24, such as memory and I/O, potentially allocatable and non-potentially allocatable, posted and non-posted, EISA bus 42 and system memory 32. The WR_Thru state machine 164 controls the data flow from the C88 cache SRAMs array 108 to the data buffer 114 and controls the status/control signals to the C55 cache controller 106, the C88 cache SRAM array 108 and the data buffer 114.

The WR_Back state machine 166 is responsible for both the line-replacement write-backs and the snoop-hit write-backs. As with the WR_Thru state machine 164, the WR_Back state machine 166 is responsible for the data flow from the C88 cache SRAM array 108 to the data buffer 114. The WR Back state machine 166 can handle either 32-byte lines or 64-byte lines, through 64 byte lines are preferred.

The RD_Addr and the RD_Data state machines 168 and 170 are responsible for all of the reads and read-allocates on the host bus 24 and EISA bus 42. The reason for the two state machines 168 and 170 is to better handle pipelined read cycles. The RD_Data state-machine 170 is also responsible for the data flow to the C88 cache SRAM array 108 during write-allocates.

The LIO state machine 172 and the LIO decoder module 174 combined perform the local I/O cycles. The LIO decoder 174 receives the address, C55 cache controller 106 status signals, and byte enable signals to determine if the requesting cycle is to go to the DSP 48, if it is to go out to the host bus 24, or if the cycle is a special cycle. The LIO decoder module 174 also determines whether an I/O write to the DSP 48 can be posted. The LIO state machine 172 handles all of the transaction for the local I/O to the data buffer 114 and DSP 48.

The Combine/Sync module 176 takes all of the common outputs from the other modules, combines the signals and synchronizes them up through a D-type flip-flop before sending the signal to an output pin. For example, the CBGT_or bus grant signal is driven by the WR_Thru state machine 164, the WR_Back state machine 166, the RD_Addr state machine 168, the LIO state machine 172 and from the Special Cycle module 142. The signals are ANDed together and the output of the AND gate is sent through a D-type flip-flop which is clocked with the PCLK signal. The output of the flip-flop is then sent to the CBGT_ output pin.

The C55 signal sampling module 134 samples, latches and holds various control/status C55 cache controller 106 signals which the SCI 110 uses throughout the transaction.

The host bus signal sampling module 136 consists of three modules. The first is the HBRDY module which is responsible for tracking the HBRDY_ and HBLAST_ signals. When both the HBRDY_ and HBLAST_ signals are sampled active on the rising edge of HCLK or host bus 24 clock signal, then the HBRDY_ signal is masked out during the next HCLK cycle. This is done to prevent any problems since the HBRDY_ signal can go to an unknown state in the HCLK cycle after the HBRDY_ and HBLAST_ signals. The second module is the LHBOFF module. This module samples the HBOFF_ or back off signal and drives the LHBOFF_ or latched HBOFF_ signal active when the HBOFF_ signal is sampled asserted. The LHBOFF_ signal is held asserted until the HBRDY_ and HBLAST_ signals of the backed off cycle are sampled asserted. The third module is the CE_RTRY module. This module is used for EISA cycles. The module creates four signals: CE_RTRY, EISA_FLAG, EISA_RST, and LH_EISA_RST. The CE_RTRY signal is a combination of the E_RTRY_ and LE_RTRY_ signals if the cycle is a locked EISA cycle. EISA_ FLAG is driven active for one HCLK signal cycle after the module has determined that the current EISA cycle will not be E_RTRYed off but will get posted. Both the EISA_RST and LH_EISA_RST signals are driven active after the module has determined that the current EISA cycle has been E_RTRYed off. The LH_EISA_RST signal is a latch-and-hold signal which is held asserted until the SCI 110 regains control of the bus and CE_RTRY signal is inactive. More details on the retry signals are provided in Ser. No. 07/955,930, filed Oct. 2, 1992 and entitled "SPLIT TRANSACTION AND PIPELINED ARBITRATION OF MICROPROCESSORS IN A MULTIPROCESSING COMPUTER SYSTEM", now U.S. Pat. No. 5,553,310, issued Sep. 3, 1996, which is hereby incorporated by reference.

The address buffer control module 138 includes an ADDR state machine and an HSTAT module. The ADDR state machine controls the latch, drive, and direction of the address buffer 112. It also controls the latch and drive of the host bus status signal out of the HSTAT module. The HSTAT module consists of registers and combinatorial logic used to create the host bus status signals from the L2 cache 104 status signals.

The host bus snooping module 140 consists of two state machines. The first state machine is responsible for tracking the host bus 24 and the snooping signals and for providing various status flags to the SCI 110 to indicate that a snoop is to occur and the status of the snoop. The second state machine is responsible for performing the snoop request. It is also responsible for driving the HPAUSE_, HSHARED_, and HBOFF_ signals onto the host bus 24. If a snoop hit to a modified line is detected, the state machine drives the WB_ST signal, which is ORed with the arbiter 162 WB_ST signal to indicate a write-back cycle is to occur.

The Special Cycle module 142 consists of three modules: HRESET, SCYC, and SSCC. The HRESET module drives PINIT and all of the configuration lines to the L2 cache 104 during hard reset. The SCYC module handles all of the special cycles. Six special cycles are initiated by the Pentium processor 100: HALT, SHUTDOWN, INVD, WBINVD, FLUSH ACKNOWLEDGE, and BRANCH TRACE MESSAGE. Two special cycles occur from signals driven by the DSP 48: soft reset and cache disable/enable. The SSCC module is responsible for providing the CBGT_, CBRDY_, and CRDY_ signals to complete the processor initiated special cycles.

It has been determined that under certain conditions, the C55 cache controller 106 does not drive the CKLOCK_ signal correctly. Specifically, when a read or snoop cycle causes a writeback operation, due to a miss on the read or a hit to a modified line on the snoop, and the next operation is a locked cycle directed by the CPU to the EISA bus 42 and an EISA bus master has control of the EISA bus 42 and is requesting access to the host bus 24 for its operation, a deadlock condition results because the C55 cache controller 106 asserts the CKLOCK_ signal during both the writeback operation and during the locked cycle to the EISA bus 42. The proper operation would have either not asserted the CKLOCK_ signal during the writeback operation or would have allowed an idle state between the writeback completion and the next CPU cycle, which is the locked EISA operation. However, the C55 cache controller 106 does provide the CKLOCK_ signal during the writeback and does not provide such an idle state. This then results in a deadlock condition. The CPU has control of the host bus 24 via the SCI 110 and is directing a locked cycle to the EISA bus 42. However, the EISA bus 42 is in use by the EISA bus master and is requesting the host bus 24. The arbiters can try and have the SCI 110 release control of the host bus 24 but the SCI 110 properly does not release the host bus 24 because of the outstanding lock cycle. The arbiters cannot back off the EISA bus master, as that is not a defined condition. So the deadlock appears and problems result. Had the idle state been provided, the arbiters and SCI 110 could have transferred control of the host bus 24 to the EISA bus master and delayed the CPU locked cycle directed to the EISA bus 42.

Figure 6:
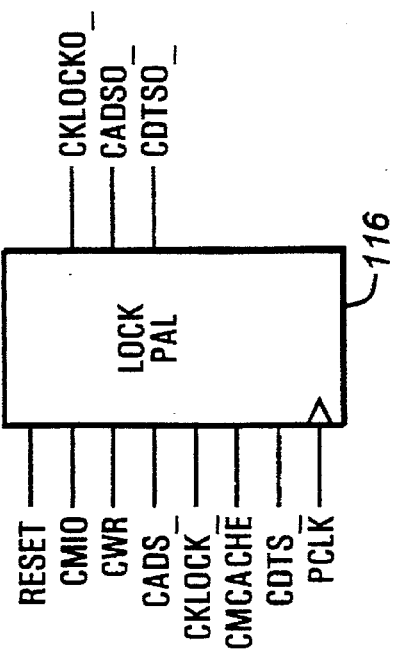
FIG. 6 is a block diagram of the LOCK PAL of FIG. 2 containing a circuit according to the present invention.

The LOCK PAL 116 (FIG. 6) is used to solve this error in the C55 which causes this deadlock. The LOCK PAL 116 receives the RST signal; CMIO, the memory or I/O signal; CWR, the write/read signal; CADS_, the address status strobe signal; the CKLOCK_ signal; CMCACHE_, the signal from the C55 cache controller 106 which indicates a writeback cycle; CDTS_, the data strobe signal; and the PCLK signal. The LOCK PAL 116 provides the CKLOCKO_ signal, the CADSO_ signal and the CDTSO_ signal to the SCI 110. The CKLOCKO_ signal is the corrected CKLOCK_ signal, while the CADSO_ and CDTSO_ signals are one PCLK cycle delayed versions of the CADS_ and CDTS_ signals for timing reasons because of the delay introduced into the CKLOCK_ signal path. The LOCK PAL 116 includes a two state state machine clocked on the PCLK signal. The IDLE state is entered on reset as indicated by the RST signal. During the IDLE state the CKLOCKO_ signal is the registered or clocked version of the CKLOCK_ signal. The state machine transfers to STATE1 when the CADS_, CMCACHE_, CWR and CMIO signals are asserted and the RST signal is not asserted. This condition indicates that a writeback cycle is occurring. With the transition to STATE1 the CKLOCKO_ signal is asserted at a high level, so that the CKLOCK_ signal is at a low or asserted level. Then while the state machine is in STATE1 the CKLOCKO_ signal remains at the asserted or high level. When the CADS_ signal is asserted and any of the CMCACHE_, CMIO or CWR signals is negated, indicating that the writeback cycle is completed, the state machine returns to the IDLE state. With this transition the CKLOCKO_ signal returns to tracking the CKLOCK_ signal. Thus the state machine positively blocks the CKLOCK_ signal during writeback cycles but allows it to pass during all other cycles. This resolves the above mentioned problem as now the only indicated lock cycle from the CPU in the problem sequence is the locked EISA directed cycle. The arbiters have no problem delaying or retrying this cycle when the EISA bus master requests the host bus 42. Therefore the deadlock is resolved by this solution.

The CADS_ and CDTS_ signals must be delayed by one PCLK cycle to the SCI 110 as it can be seen that the LOCK PAL 116 requires one cycle to perform the writeback cycle decode and properly set the CKLOCKO_ signal provided to the SCI 110 in place of the erroneous CKLOCK_ signal.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A method for use with a second level writeback cache system in a computer system, the computer system including a processor having a first level cache system which is in turn connected to the second level cache system, a host bus coupled to the second level cache system, and an input/output bus coupled to the host bus, the input/output bus receiving bus masters capable of requesting cycles on the host bus, the processor providing cycles to the second level cache system, the second level cache system providing cycles to the host bus and providing a bus lock signal during writeback operations followed by a locked processor cycle directed to the input/output bus, the method comprising the steps of:

receiving signals indicating the cycle being provided by the second level cache system;

determining if a writeback cycle is occurring; and providing a corrected bus lock signal which tracks the bus lock signal at times other than when a writeback cycle is occurring and blocks the bus lock signal to allow one of said bus masters to assert control over said host bus when a writeback cycle is occurring.

2. The method of claim 1, wherein the second level cache system also provides addresses and data for the host bus and provides strobe signals indicating the availability of the addresses and data, the method further comprising the step of:

delaying the address and data strobe signals for a period suitable to cooperate with the corrected bus lock signal.

3. A circuit for use with a second level writeback cache system in a computer system, the computer system including a processor having a first level cache system which is in turn connected to the second level cache system, a host bus coupled to the second level cache system, and an input/output bus coupled to the host bus, the input/output bus receiving bus masters capable of requesting cycles on the host bus, the processor providing cycles to the second level cache system, the second level cache system providing cycles to the host bus and providing a bus lock signal during writeback operations followed by a locked processor cycle directed to the input/output bus, the circuit comprising:

a receiver circuit receiving signals indicating the cycle being provided by the second level cache system;

writeback cycle detection logic, coupled to said receiver circuit and determining if a writeback cycle is occurring; and bus deadlock prevention circuitry providing a corrected bus lock signal tracking said bus lock signal at times other than when a writeback cycle is occurring, and blocking said bus lock signal to permit one of said bus masters to assert control over said host bus when a writeback cycle is occurring.

4. The circuit of claim 3, wherein the second level cache system also provides addresses and data for the host bus and provides strobe signals indicating the availability of the addresses and data, the circuit further comprising:

logic for delaying the address and data strobe signals for a period suitable to cooperate with the corrected bus lock signal.

5. The circuit of claim 3, wherein said logic providing the corrected bus lock signal includes a state machine.

6. A computer system, comprising:

a processor having a first level cache system;

a second level writeback cache system connected to said processor, said processor providing cycles to said second level cache system;

a host bus coupled to the second level cache system, said second level cache system providing cycles to said host bus and a bus lock signal;

an input/output bus coupled to said host bus, said input/output bus receiving bus masters capable of requesting cycles on said host bus; and a correction circuit, said correction circuit including:

a receiver circuit receiving signals indicating the cycle being provided by said second level cache system;

writeback cycle detection logic, coupled to said receiver circuit and determining if a writeback cycle is occurring; and bus deadlock prevention circuitry providing a corrected bus lock signal tracking said bus lock signal at times other than when a writeback cycle is occurring, and blocking said bus lock signal to permit one of said bus masters to assert control over said host bus when a writeback cycle is occurring;

wherein said second level cache system provides said bus lock signal during writeback operations followed by a locked processor cycle directed to said input/output bus.

7. The computer system of claim 6, wherein said second level cache system also provides addresses and data for said host bus and provides strobe signals indicating the availability of said addresses and data, said correction circuit further comprising:

logic for delaying said address and data strobe signals for a period suitable to cooperate with said corrected bus lock signal.

8. The computer system of claim 6, wherein said logic for providing said corrected bus lock signal includes a state machine.

* * * * *